United States Patent [19]
Feola et al.

[11] Patent Number: 5,936,013
[45] Date of Patent: Aug. 10, 1999

[54] PROCESS FOR THE PREPARATION OF FORMULATIONS COMPRISING BISMUTH SALTS, AND THEIR USE AS CATALYST COMPONENT IN CATHODIC ELECTRODEPOSITION COATING MATERIALS

[75] Inventors: Roland Feola, Graz; Brigitte Burgmann, Traiskirchen; Franz Kurzmann, St. Georgen/Stiefing, all of Austria

[73] Assignee: Vianova Resins AG, Werndorf, Australia

[21] Appl. No.: 08/933,845

[22] Filed: Sep. 19, 1997

Related U.S. Application Data

[63] Continuation of application No. 08/605,068, filed as application No. PCT/AT94/00123, Sep. 2, 1994, abandoned.

[30] Foreign Application Priority Data

Sep. 7, 1993 [AT] Austria ..................... 1794/93

[51] Int. Cl.⁶ ..................................... C08L 63/00
[52] U.S. Cl. .......... 523/414; 523/415; 523/460; 523/505; 525/506; 528/285
[58] Field of Search ................... 523/414, 415, 523/460, 505; 528/285; 525/506

[56] References Cited

U.S. PATENT DOCUMENTS

| | | | |
|---|---|---|---|
| 4,007,154 | 2/1977 | Schimmel et al. | 260/37 |
| 4,009,133 | 2/1977 | Jones | 260/29.2 |
| 4,040,924 | 8/1977 | Jones | 204/181 |
| 4,081,343 | 3/1978 | Schimmel et al. | 204/181 |
| 4,162,205 | 7/1979 | Wilson et al. | 204/43 |
| 4,195,972 | 4/1980 | Lapidus | 8/10.1 |
| 4,436,931 | 3/1984 | Sanderson et al. | 560/246 |
| 4,894,429 | 1/1990 | Grogler et al. | 528/45 |

FOREIGN PATENT DOCUMENTS

| | | |
|---|---|---|
| 380 260 | 5/1986 | Austria . |
| 394 372 | 3/1992 | Austria . |
| 397 820 | 7/1994 | Austria . |
| 0 107 088 | 5/1984 | European Pat. Off. . |
| 0 107 089 | 5/1984 | European Pat. Off. . |
| 0 107 098 | 5/1984 | European Pat. Off. . |
| 0 251 772 | 1/1988 | European Pat. Off. . |
| 0 336 599 | 10/1989 | European Pat. Off. . |
| 0 376 674 | 7/1990 | European Pat. Off. . |
| 0 379 246 | 7/1990 | European Pat. Off. . |
| 26 34 229 | 1/1982 | Germany . |
| 26 34 211 | 10/1982 | Germany . |
| WO 93/24578 | 12/1993 | WIPO . |

OTHER PUBLICATIONS

Derwent Publications Ltd., accession No. 83–18 555, abstract of JP 58–006243, Jan. 13, 1983.

*Primary Examiner*—Randy Gulakowski
*Attorney, Agent, or Firm*—Foley & Lardner

[57] ABSTRACT

The invention pertains to a method for producing preparations containing bismuth salts, wherein bismuth oxide is reacted in a specific way with lactic acid and the resulting mixture of bismuthyl lactate and bismuth lactate is dispersed in a binder. These preparations are used as catalytic components in electrophoretic paints to be applied by cathodic deposition. Dipping paints of this kind have excellent application and film properties. This obviates the need to use lead and tin compounds as catalysts.

14 Claims, No Drawings

PROCESS FOR THE PREPARATION OF FORMULATIONS COMPRISING BISMUTH SALTS, AND THEIR USE AS CATALYST COMPONENT IN CATHODIC ELECTRODEPOSITION COATING MATERIALS

This application is a continuation of application Ser. No. 08/605,068, filed Mar. 7, 1996, which is National Phase of PCT/AT94/00123, filed Sep. 2, 1994.

BACKGROUND OF THE INVENTION

1. Field of the Invention

The invention relates to a process for the preparation of formulations comprising bismuth salts, where bismuth oxide is reacted in a specific way with lactic acid and then the resulting mixture of bismuthyl lactate and bismuth lactate is dispersed in a coating binder, and to the use of these formulations as catalyst component in cathodic electrodeposition coating materials.

2. Description of Related Art

AT 397.820 B1 discloses a process for the preparation of catalyst-containing cationic coating binders which are water-dilutable after protonation, and which comprise cationic coating binders crosslinkable by transesterification and/or transamidation and/or transurethanization and/or by reaction of terminal double bonds, and bismuth salts of aliphatic hydroxycarboxylic acids, preferably of lactic acid or dimethylolpropionic acid.

According to this proposal, the bismuth salts are obtained by the reaction of 1.0 mol of bismuth oxide with 7.0 mol of the respective hydroxycarboxylic acid, the excess of 1.0 mol of acid being intended to guarantee as quantitative a reaction as possible. Deionized water and the acid are the initial charge, and commercial bismuth oxide ($Bi_2O_3$) is added in portions at 70° C. with stirring. The precipitate is filtered off and dried at a temperature of from 40 to 60° C.

The catalyst-containing coating binders are prepared by adding the bismuth salt of the protonated binder solution, prior to the addition of substantial quantities of water as diluent, and then homogenizing the mixture for a number of hours.

According to WO 93/24578, claims 3 and 5, the bismuth salt is homogenized in a high-speed mixer, in a coating binder which can be used as paste resin, and then in a bead mill, if desired in the presence of pigments.

The processes described in the two patent documents exhibit a number of substantial disadvantages in their industrial applicability.

On the one hand, the isolated and dried bismuth salts have a tendency while being stored to undergo agglomeration. On the other hand, the quantity of acid required for the "digestion" of the bismuth oxide is greater than that which is subsequently required for neutralizing the overall coating binder. Consequently, excess acid is introduced into the deposition coating material, thereby considerably increasing the amount of current required during the operation of the deposition tank.

The specific embodiment which is described in both patent documents for the case where lactic acid or dimethylolpropionic acid is used as neutralizing agent for the overall binder, of homogenizing not bismuth salt but, wholly or partially, the corresponding quantities of bismuth oxide or bismuth hydroxide—in this in situ method it is not necessary to isolate the bismuth salts—is likewise only of conditional success. Coating materials formulated correspondingly have in many cases a tendency to form a sediment after prolonged storage, and furthermore a reduction in the catalytic activity of the bismuth salts is observed.

If, in contrast, the quantity of acid is reduced to less than 7.0 mol per 1.0 mol of bismuth oxide, then during the "digestion" the reaction mixture frequently forms a tacky crystalline mass which can neither be stirred nor filtered.

Even the use of a paste resin in accordance with WO 93/23578 does nothing to alter the difficulties indicated.

SUMMARY OF THE INVENTION

It has now surprisingly been found that an amendment to the "digestion process" for the bismuth oxide enables the practical use of the bismuth salts of lactic acid as catalyst component in cathodic electrodeposition coating materials.

The invention accordingly relates to a process for the preparation of formulations which comprise bismuth salts and are intended for catalyzing the crosslinking reactions of cationic coating binders, which process is characterized in that A) 1.0 mol of bismuth oxide is reacted in steps with a total of 4.0 mol of lactic acid, the steps comprising
  Aa) first homogenizing 1.0 mol of bismuth oxide and 2.0 mol of lactic acid in the presence of water at from 20 to 40° C. for from 30 to 60 minutes.
  Ab) adding 1.0 mol of lactic acid, to the mixture obtained in Aa) and again homogenizing at from 30 to 40° C. for from 30 to 60 minutes, and
  Ac) repeating the procedure according to Ab), carrying out homogenization until the color of the reaction mixture has changed from an initial yellow to white, and
B) the mixture of bismuthyl lactate and bismuth lactate obtained according to Aa) to Ac) is subsequently combined with a cationic coating binder, with the proviso that the content of bismuth, based on the overall solids content of the formulation, is from 25 to 45% by weight, preferably from 30 to 40% by weight.

The invention additionally relates to the use of the formulations prepared in accordance with the invention, if desired in the form of pigment pastes, in combination with cationic coating binders crosslinkable by transesterification and/or transamidation and/or transurethanization and/or by reaction of terminal double bonds, these binders being identical to or different from the coating binders present in the formulation and being, if desired, in the form of dispersions, for the formulation of cathodic electrodeposition coating materials, with the proviso that these materials have a content of bismuth, based on the solids content of the overall coating binder, of from 0.5 to 3.0% by weight, preferably from 0.8 to 2.5% by weight.

The invention relates lastly to cathodic electrodeposition coating materials having a content of bismuth, based on the solids content of the overall coating binder, of from 0.5 to 3.0% by weight, preferably from 0.8 to 2.5% by weight, which comprise the formulations prepared in accordance with the invention, if desired in the form of pigment pastes, and further cationic coating binders crosslinkable by transesterification and/or transamidation and/or transurethanization and/or by reaction of terminal double bonds, these binders being identical to or different from the coating binders present in the formulation and being, if desired, in the form of dispersions.

DETAILED DESCRIPTION OF PREFERRED EMBODIMENTS

The claimed process is technologically simple and is of outstanding reproducibility even with large batches. The cathodic electrodeposition coating materials exhibit excellent application and film properties. It is possible to dispense with the use of lead compounds and tin compounds as catalysts.

The formulations are prepared by the procedure defined in the main claim. After the reaction steps Aa) to Ac), the mixture of bismuthyl lactate and bismuth lactate is combined with a cationic coating binder. It is advantageous if the formulations have a viscosity in the range from 4000 to 10,000 mPa.s/23° C. Consequently, they can easily be manipulated and are flowable even at room temperature.

For the formulations it is customary to select the same cationic coating binders used as "base resins" for the preparation of the cathodic electrodeposition coating materials, but without a curing component and not in dispersion form.

Large numbers of such coating binders crosslinkable by transesterification and/or transamidation and/or transurethanization and/or by reaction of terminal double bonds are known from the literature. A more detailed examination of the structure and chemistry of these products is therefore unnecessary.

If the formulations are processed further in the form of pigment pastes, it is advantageous in reaction step (B) to use specific pigment paste resins as are described, for example, in DE 2634211 C2, DE-A-2634229, EP 107088 A1, EP 107089 A1, EP 107098 A1, EP 251772 A2, EP 336599 A2, Austrian Patent 380 264 and Austrian Patent 394372.

The formulation, further processing and use of the pigment pastes and coating materials is known to the person skilled in the art.

The cathodic electrodeposition coating materials have a very good storage stability even over a prolonged period, i.e. they exhibit neither the formation of a sediment nor any drop in reactivity. The properties of the deposited wet films and of the crosslinked films are completely in accordance with the very high quality standard required by the automotive industry.

The examples illustrate the invention without limiting it in its scope. All parts or percentages relate to units by weight.

The following abbreviations are used in the examples:

| | |
|---|---|
| EEW | epoxy resin equivalent weight, i.e. that quantity (in grams) of an epoxy resin which contains one epoxide group |
| EGL | ethylene glycol monoethyl ether |
| DEAPA | diethylaminopropylamine |
| CE | glycidyl ester of a $C_9$–$C_{11}$-tert-monocarboxylic acid |
| BUGL | monoethylene glycol monobutyl ether |
| MP | methoxypropanol |
| TDI | tolylene diisocyanate (commercial isomer mixture) |
| DGDME | diethylene glcyol dimethyl ether |
| PF 91 | paraformaldehyde, 91% strength |
| VEW | deionized water |
| MEQ | milliequivalents of acid per 100 g of binder (solids) |

1. Preparation of the Formulations KAT 1 to KAT4 Comprising Bismuth Salts (Examples 1 to 4)

The formulations KAT 1 to KAT 4 containing bismuth salts are prepared from the products indicated in Table 1 in the appropriate proportions in the manner described below:

VEW and the lactic acid I (2.0 mol) are introduced into an appropriate reaction vessel fitted with a stirrer. Bismuth oxide (1.0 mol) is added in portions with stirring. The mixture is homogenized for from 30 to 60 minutes, the temperature rising to about 40° C.

The lactic acid II (1.0 mol) is then added. The mixture is again homogenized for from 30 to 60 minutes.

Following the addition of lactic acid III (1.0 mol), the mixture is homogenized until its color has changed from an original yellow to white (without any notable yellow tinge).

Finally, to the resulting mixture of bismuthyl lactate and bismuth lactate, there is added a cationic coating binder in a quantity such that the mixture remains readily flowable even after prolonged storage and the bismuth salt does not form a sediment (viscosity range from about 4000 to 10,000 mPa.s/23° C.).

TABLE 1

| | Example 1 KAT 1 | Example 2 KAT 2 | Example 3 KAT 3 | Example 4 KAT 4 |
|---|---|---|---|---|
| VEW | 300 | 300 | 300 | 300 |
| Lactic acid I (2.0 mol) | 180 | 180 | 180 | 180 |
| $Bi_2O_3$ | 466 | 466 | 466 | 466 |
| Lactic acid II (1.0 mol) | 90 | 90 | 90 | 90 |
| Lactic acid III (1.0 mol) | 90 | 90 | 90 | 90 |
| Binder B1 (65%) | 500 | — | — | — |
| Binder B3 (65%) | — | 400 | — | — |
| Binder B4 (40%) | — | — | 1126 | — |
| Binder B2 (57%) | — | — | — | 800 |
| | 1626 | 1526 | 2252 | 1926 |
| Total solids | 1151 | 1086 | 1276 | 1282 |
| Bismuth content/ total solids | 36.3% | 38.5% | 32.7% | 32.6% |

2. Preparation of the Binder Components Used, for Example, for the Formulations KAT 1 to KAT 4 and for the Formulation of the Electrodeposition Coating Materials 2.1. Binder B1:

190 g of a bisphenol A epoxy resin (EEW about 190) and 1425 g of a bisphenol A epoxy resin (EEW about 475) are dissolved at 100° C. in 597 g of EGL. The solution is cooled to 60° C. and 126 g of diethanolamine are added. The temperature is raised slowly to 80° C. over the course of 2 hours. Then 169 g of DEAPA are added. The temperature is raised to 120° C. over 2 hours. At this temperature, 478 g of CE are added, and the mixture is stirred at 130° C. for 5 hours and, finally, is diluted with EGL to a solids content of 65% by weight. The resin has an amine number of 91 mg of KOH/g and a hydroxyl number of 265 mg of KOH/g, in each case based on the solids.

2.2. Binder B2:

2 g of azobisisobutyronitrile are dissolved in 40 g of isopropanol with heating. To the clear solution there is added, at reflux temperature (about 84° C.) and at a uniform rate over 2 hours, a monomer mixture consisting of 20 g of glycidyl methacrylate, 20 g of hydroxyethyl methacrylate, 20 g of methyl methacrylate and 40 g of 2-ethylhexyl acrylate in which 2 g of azobisisobutyronitrile have been dissolved to give a clear solution. The reaction mixture is stirred at reflux temperature for a further 3 hours. A homogeneous solution of 16 g of diisopropanolamine in 20 g of BUGL is then added quickly to the reaction mixture at 85° C., the mixture is stirred at 90° C. for another 2 hours, and the product is finally diluted at 90° C. with 13 g of EGL and at 40° C. with acetone.

The resin has a solids content of 57% by weight, an amine number of 58 mg of KOH/g and a hydroxyl number of 250 mg of KOH/g, in each case based on solids.

2.3. Binder B3:

570 g of an epoxy resin based on bisphenol A (EEW about 190) and 317 g of MP are heated to 60° C., a mixture of 116 g (0.9 mol) of ethylhexylamine and 163 g (0.15 NH equivalent) of a polymeric amine (see below) is added over the course of 2 hours, and the mixture is reacted until the MEQ value is 2.06. Then 1330 g (2.1 mol) of a 75% strength solution of a bisphenol A epoxy resin (EEW about 475) in MP are added. Subsequently, at 60° C., a solution of 189 g (1.8 mol) of diethanolamine in 176 g of MP is added over the course of one hour and the reaction is carried on to a MEW value of 1.57. Following the further addition of a solution of 78 g (1.2 mol) of DEAPA in 54 g of MP over the course of one hour, the mixture is reacted at 60° C. until the MEQ value is 1.46. The temperature is raised to 90° C. and then, over the course of a further hour, to 120° C. On reaching a viscosity (GARDNER-HOLD; 6 g of resin+4 g of MP) of I-J, the mixture is diluted with MP to a solids content of 65% by weight. The product has an amine number of 117 mg of KOH/g and a hydroxyl number of 323 mg of KOH/g, in each case based on solids.

The polymeric amine is prepared by reacting 1 mol of diethylenetriamine with 3.1 mol of 2-ethylhexyl glycidyl ether and 0.5 mol of a bisphenol A epoxy resin (EEW about 190) in 80% strength solution in MP. The product has a viscosity (DIN 53211/20° C.; 100 g of resin+30 g of MP) of from 60 to 80 seconds.

2.4. Binder B4:

(according to Austrian Patent 394372, Example 1)

258 parts (2 mol) of 2-ethylhexylamine are placed in an appropriate reaction vessel fitted with stirrer, thermometer and distillation device, and are heated to 80° C., and then 380 parts of an aliphatic epoxy resin (based on polypropylene glycol, EEW about 190) are added at a uniform rate over the course of one hour. During this addition the temperature rises to 120° C. The mixture is held at 120° C. for a further hour. Then 693 parts of BUGL and, at 70° C., 1900 parts of an epoxy resin based on bisphenol A (EEW about 475) are added. The mixture is again heated to 120° C. and the reaction is continued at this temperature for 1½ hours. The intermediate has a proportion of polyoxyalkylene structural units of 11% by weight and a proportion of alkyl radicals having more than 3 carbon atoms of 9% by weight.

At 100° C., 204 parts (2 mol) of dimethylaminopropylamine are added to this intermediate. After 1 hour at 100° C., 66 parts (2 mol) of PF 91 are added to the mixture, and about 36 parts of water of reaction are removed at about 140° C. by azeotropic distillation using methyl isobutyl ketone as entrainer. The methyl isobutyl ketone is then stripped off in vacuo, and the mass is neutralized at about 80° C. with 200 parts of 30% strength acetic acid (36 mmol/100 solids) and diluted with 3265 parts of VEW to a solids content of about 40%.

2.5. CrosslinkinQ component VK 1:

In a reaction vessel which is fitted with a device suitable for the azeotrope method and with a bubble-cap column for separating off the alcohol component which is formed in the partial transesterification, 29.7 g (0.9 mol) of PF91 are added in portions to a mixture of 160 g (1 mol) of diethyl malonate, 0.34 g (0.004 mol) of piperidine and 0.22 g (0.004 mol) of 85% strength formic acid at 80° C., at a rate such that, when the exothermic reaction begins, a temperature of 95° C. is not exceeded. The reaction mixture is stirred at 95° C. until the PF 91 has dissolved completely. The temperature is raised to 110° C. over the course of 2 hours, accompanied by the commencement of the elimination of water. After reaching 110° C., a total of 9 g of water are distilled off using petroleum spirit (boiling range 80–120° C.) as entrainer. The entrainer employed is then removed by application of vacuum.

Following the addition of 22.8 g (0.3 mol) of 1,2-propylene glycol, the mixture is heated until the commencement of distillation (140–150° C.) . As the temperature rises, 27 parts (0.6 mol) of ethanol are distilled off. The product obtained has a solids content (120° C., 30 minutes) of about 92% by weight, an OH number of below 5 mg of KOH/g, an intrinsic viscosity of about 5.2 ml/g (20° C., dimethylformamide) and a refractive index n 20/d of 1.4670.

2.6. Crosslinking component VK 2:

Reaction product of 134 g (1 mol) of trimethylolpropane with 851 g (2.8 mol) of a TDI semi-blocked with 2-ethylhexanol, in 70% strength solution in DGDME.

2.7. Crosslinking component VK 3:

160 g (1 mol) of diethyl malonate are added to 134 g (1 mol) of trimethylolpropane, and the mixture is heated until distillation begins (about 140–150° C.) . As the temperature rises (to 180° C.) , 46 g (1 mol) of ethanol are distilled off. After the end of the reaction, the mixture is diluted with 128 g of DGDME and cooled to 60° C. Then 264 g (1 mol or 1 NCO equivalent) of a reaction product of 1 mol of TDI and 1 mol of EGL are added over the course of 4 hours, and reacted at 60° C. to an NCO content of below 0.02 milliequivalent per g of sample.

The product obtained has a solids content of 80±2% by weight (30 minutes, 120° C.) , a GARDNER-HOLD viscosity (10 g of product+2 g of DGDME) of K and a refractive index n 20/d of 1.4960.

3. Testing of the Formulations KAT 1 to KAT 4 Comprising Bismuth Salts as Catalyst Component in Cathodic Electrodeposition Coating Materials

3.1. Preparation of paints 1 to 6

| | |
|---|---|
| 2499 | binder B4 (40%) |
| 40 | carbon black pigment |
| 4960 | titanium dioxide |
| 92 | formic acid 5N |
| 2409 | VEW |
| 10,000 | pigment paste, 60% strength |

The quantities of KAT 1 to KAT 4 corresponding to Table 2 are admixed to the batch either before grinding in the bead mill or to the finished pigment paste.

From 90 parts of the cationic binder combination (70 parts of binder and 30 parts of crosslinking component, see Table 2) and 60 parts of the pigment paste (in each case based on solids, without taking into account the added quantity of the formulation which comprises bismuth salts), paints with a pigment/binder ratio of 0.5:1 are prepared under conditions corresponding to those of practice.

TABLE 2

| Paint | Binder comb. 70/30 parts[1] | Formulation[1] | | % Bismuth[2] |
|---|---|---|---|---|
| 1 | B1/V1 | KAT 1 | 3 parts | 1.0 |
| 2 | B2/V2 | KAT 2 | 5 parts | 1.8 |
| 3 | B3/V3 | KAT 3 | 2.5 parts | 0.8 |
| 4 | B1/V2 | KAT 4 | 8 parts | 2.4 |
| 5 | B2/V3 | KAT 1 | 4 parts | 1.4 |
| 6 | B3/V1 | KAT 2 | 6 parts | 2.2 |

[1] In each case based on solids
[2] Bismuth content based on the overall solids content of the coating binders

3.2. Evaluation of the deposited and subsequently baked paint films

The paint batches are adjusted with VEW to a solids content of 18%.

After a homogenization period of 24 hours, the paints are applied by cathodic deposition to cleaned, non-phosphatized steel panels. The conditions for the deposition are chosen such that the films have a dry film thickness of 22±2 μm. Curing takes place by baking in a convection oven (20 min./170° C.).

All of the coatings exhibit excellent mechanical properties (impact test according to ASTM-D-2794-90: at least 80 i.p.; no flaking in the mandrel bending test according to ASTM D-522-88) and outstanding corrosion resistance (salt spray test according to ASTM B 117-90 after 360 hours' test duration: max. 2 mm)

3.3. Testing of the storage stability of paints 1 to 6

After a four-week "stir test" (application viscosity, room temperature), the paints show no sediment (less than 20 mg/l, Perlon sieve 28 μm mesh size) and are of undiminished reactivity (repetition of tests carried out in 3.2.).

We claim:

1. A process for preparing formulations comprising bismuth salts, the process comprising:
   A) reacting 1.0 mol of bismuth oxide in the following steps Aa) to Ac) with a total of 4.0 mol of lactic acid;
      Aa) homogenizing 1.0 mol of bismuth oxide and 2.0 mol of lactic acid in the presence of water at from 20 to 40° C. for from 30 to 60 minutes,
      Ab) adding 1.0 mol of lactic acid to the mixture obtained in Aa) and again homogenizing this mixture at from 30 to 40° C. for from 30 to 60 minutes, and
      Ac) repeating the procedure according to Ab), carrying out homogenization until the color of the reaction mixture has changed from an initial yellow to white to thereby form a mixture comprising bismuthyl lactate and bismuth lactate; and
   B) combining the mixture comprising bismuthyl lactate and bismuth lactate obtained according to Aa) to Ac) with a cationic coating binder, with the proviso that the content of bismuth, based on the overall solids content of the formulation, is from 25 to 45 % by weight.

2. The process as claimed in claim 1, wherein the content of bismuth, based on the overall solids content of the formulation, is from 30 to 40% by weight.

3. The process as claimed in claim 1, wherein in step B), the cationic coating binder is crosslinkable by a process selected from the group consisting of transesterification, transamidation, transurethanization, reaction of terminal double bonds, and combinations thereof.

4. The process as claimed in claim 1, wherein the cationic coating binder is a pigment paste resin.

5. The process as claimed in claim 1, wherein the formulations have a viscosity in the range of from 4000 to 10,000 mPa·s/23° C.

6. The process as claimed in claim 1, wherein the content of bismuth, based on the overall solids content of the formulation, is from 32.6 to 38.5% by weight.

7. A process for making a cathodic electrodeposition material comprising combining: (1) a formulation prepared in accordance with the process of claim 1; and (2) a cationic coating binder that is crosslinkable by a process selected from the group consisting of transesterification, transamidation, transurethanization, reaction of terminal double bonds, and combinations thereof, said cationic coating binder of (2) above being the same or different from the cationic coating binder of step B), with the proviso that the cathodic electrodeposition material has a content of bismuth, based on the solids content of the overall cationic coating binder of B) and (2), of from 0.5 to 3.0% by weight.

8. The process as claimed in claim 7, wherein the content of bismuth, based on the solids content of the overall coating binder, is from 0.8 to 2.5% by weight.

9. The process as claimed in claim 7, wherein the cathodic electrodeposition material is in the form of a dispersion.

10. The process as claimed in claim 7, wherein the content of bismuth, based on the solids content of the overall coating binder, is from 0.8 to 2.4% by weight.

11. A cathodic electrodeposition material prepared in accordance with claim 7.

12. The cathodic electrodeposition material as claimed in claim 11, wherein the content of bismuth, based on the solids content of the overall coating binder, is from 0.8 to 2.5% by weight.

13. The cathodic electrodeposition material as claimed in claim 11, wherein the cathodic electrodeposition material is in the form of a dispersion.

14. The cathodic electrodeposition material as claimed in claim 11, wherein the content of bismuth, based on the solids content of the overall coating binder, is from 0.8 to 2.4% by weight.

* * * * *

UNITED STATES PATENT AND TRADEMARK OFFICE
CERTIFICATE OF CORRECTION

PATENT NO. : 5,936,013
DATED : August 10, 1999
INVENTOR(S) : Roland FEOLA et al.

It is certified that error appears in the above-indentified patent and that said Letters Patent is hereby corrected as shown below:

On the title page, Item [73], Assignee, please delete "Australia" and insert --Austria--.

Signed and Sealed this

Seventh Day of December, 1999

Attest:

Q. TODD DICKINSON

*Attesting Officer*  *Acting Commissioner of Patents and Trademarks*